US010626248B2

(12) United States Patent
Guesman et al.

(10) Patent No.: US 10,626,248 B2
(45) Date of Patent: Apr. 21, 2020

(54) FLEXIBLE TUBE

(71) Applicant: SAINT-GOBAIN PERFORMANCE PLASTICS CORPORATION, Solon, OH (US)

(72) Inventors: Josef E. Guesman, Uniontown, OH (US); Wayne E. Garver, Hudson, OH (US); Kathryn J. Morris, Akron, OH (US); Nathan Klettlinger, Medina, OH (US); Mark F. Colton, Rootstown, OH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 806 days.

(21) Appl. No.: 14/142,108

(22) Filed: Dec. 27, 2013

(65) Prior Publication Data

US 2014/0186564 A1 Jul. 3, 2014

Related U.S. Application Data

(60) Provisional application No. 61/747,244, filed on Dec. 29, 2012.

(51) Int. Cl.
*C08K 5/1515* (2006.01)
*C08K 5/103* (2006.01)
*F16L 11/06* (2006.01)

(52) U.S. Cl.
CPC .............. *C08K 5/103* (2013.01); *F16L 11/06* (2013.01); *Y10T 428/139* (2015.01)

(58) Field of Classification Search
CPC ........ A61J 1/10; A61L 29/141; A61L 31/048; A61L 31/141; A61L 29/041; A61L 27/06;
(Continued)

(56) References Cited

U.S. PATENT DOCUMENTS 4,586,928 A * 5/1986 Barnes ...................... A61J 1/10
604/200
4,710,532 A 12/1987 Hull et al.
(Continued)

FOREIGN PATENT DOCUMENTS

CN 101955616 A 1/2011
CN 101962460 A 2/2011
(Continued)

OTHER PUBLICATIONS

Oxyvinlys280 product sheet.*
(Continued)

*Primary Examiner* — Ellen S Wood
(74) *Attorney, Agent, or Firm* — Abel Schillinger, LLP; Chi Suk Kim

(57) ABSTRACT

A flexible tube includes a polymer composition of a poly vinyl chloride having a molecular weight greater than about 1.0 inherent viscosity (IV) and a bio-based plasticizer. Further, a method of forming a flexible tube is provided. The method includes compounding a poly vinyl chloride having a molecular weight greater than about 1.0 inherent viscosity (IV) with a bio-based plasticizer to form a polymer composition and extruding the polymer composition into the flexible tube.

19 Claims, 4 Drawing Sheets

(58) Field of Classification Search
CPC ......... Y10T 428/1379; Y10T 428/1345; Y10T 428/1352; Y10T 428/1334; Y10T 428/139; Y10T 428/1341
USPC .......................... 428/35.2, 35.4, 35.5, 35.7
See application file for complete search history.

(56) References Cited

U.S. PATENT DOCUMENTS

| | | | |
|---|---|---|---|
| 5,143,959 A * | 9/1992 | Carette | C08K 3/26 252/400.3 |
| 5,210,140 A | 5/1993 | Greenlee et al. | |
| 5,721,024 A * | 2/1998 | Carmen | A61J 1/10 422/40 |
| 6,060,138 A | 5/2000 | Carmen et al. | |
| 7,276,546 B2 | 10/2007 | Buchanan et al. | |
| 7,297,738 B2 | 11/2007 | Gosse et al. | |
| 7,413,813 B2 | 8/2008 | Gosse et al. | |
| 7,585,571 B2 | 9/2009 | Gosse et al. | |
| 7,855,340 B2 | 12/2010 | Gosse et al. | |
| 8,349,930 B2 | 1/2013 | Nielsen et al. | |
| 8,697,787 B2 * | 4/2014 | Chaudhary | C08L 27/06 524/114 |
| 2010/0001012 A1 | 1/2010 | Wilson | |
| 2010/0010127 A1 * | 1/2010 | Barki | C07D 301/12 524/114 |
| 2010/0056681 A1 | 3/2010 | Colle et al. | |
| 2010/0094086 A1 | 4/2010 | Konstantin | |
| 2010/0108940 A1 | 5/2010 | De Munck et al. | |
| 2010/0160506 A1 | 6/2010 | Wu et al. | |
| 2010/0249299 A1 | 9/2010 | Dakka et al. | |
| 2010/0298477 A1 | 11/2010 | Godwin | |
| 2011/0021658 A1 | 1/2011 | Selifonov et al. | |
| 2011/0021680 A1 | 1/2011 | Colle et al. | |
| 2011/0076502 A1 | 3/2011 | Chaudhary et al. | |
| 2011/0098390 A1 | 4/2011 | Dakka et al. | |
| 2011/0272174 A1 | 11/2011 | Chaudhary | |
| 2012/0214919 A1 | 8/2012 | Wiebe et al. | |
| 2013/0331491 A1 | 12/2013 | Becker et al. | |
| 2014/0069299 A1 | 3/2014 | Becker et al. | |

FOREIGN PATENT DOCUMENTS

| | | |
|---|---|---|
| CN | 101962461 A | 2/2011 |
| DE | 3520750 A1 | 2/1986 |
| EP | 2011819 A1 | 1/2009 |
| JP | S6151044 A | 3/1986 |
| JP | 2010514833 A | 5/2010 |
| WO | 2008081330A A1 | 7/2008 |
| WO | 2010074738 A1 | 7/2010 |
| WO | 2010151558 A1 | 12/2010 |
| WO | 2011004390 A2 | 1/2011 |
| WO | 2011041372 A1 | 4/2011 |
| WO | 2011041380 A1 | 4/2011 |
| WO | 2012016674 A2 | 2/2012 |
| WO | 2012113608 A1 | 8/2012 |
| WO | 2012130545 A1 | 10/2012 |
| WO | 2014106070 A1 | 7/2014 |

OTHER PUBLICATIONS

OxyVinyls 240F data Sheet.*
International Search Report for PCT/US2013/078024 dated Apr. 1, 2014, 4 pgs.
Grindsted Soft-N-Safe, The sustainable plasticiser for PVC, Danisco, <http://www.danisco.com/softnsafe/doc/snsbrochure.pdf>, printed Mar. 13, 2014, 8 pages.
Preliminary Technical Data Sheet Geon Specialty Suspension Series Resin Experimental Product: Geon E-46 Vinyl Chloride Homopolymer—For developmental use, PolyOne, Specialty Resins, <www.PolyOne.com>, printed Dec. 11, 2012, 1 page.
OxyVinyls, OxyVinyls 255F, printed Dec. 11, 2012 ,1 page.
Supplemental European Search Report from EP13867201 dated Jul. 26, 2016, 1 pg.
Jiang Xiangyun, "Materials for Industrial Design and Processing Technology," Beijing Institute of Technology Press, Nov. 2010, Edition 2, pp. 97-98.

* cited by examiner

FLEXIBLE TUBE

CROSS-REFERENCE TO RELATED APPLICATION

This application claims priority under 35 U.S.C. § 119(e) to U.S. Patent Application No. 61/747,244 entitled "FLEXIBLE TUBE," by Guesman et al., filed Dec. 29, 2012, which is assigned to the current assignee hereof and incorporated herein by reference in its entirety.

FIELD OF THE DISCLOSURE

This disclosure in general relates to a flexible tube and in particular, to a flexible tube including a bio-based plasticizer.

BACKGROUND

Flexible tube is used in a variety of industries and household products. In particular, flexible tube is often used in healthcare products, such as catheters and other medical or biopharm tubing. In addition, flexible tube is used in household products such as hydration products, including portable and potable water containers. Conventional tubes for such applications are made using plasticized polyvinyl chloride.

Polyvinyl chloride based products have been used widely in medical fields for healthcare products such as films, gloves, bags, catheters and tubing. In particular, most of the disposable medical devices are produced from plasticized flexible PVC. To form flexible PVC products, manufacturers typically use plasticizers or processing aids, such as di-2-ethylhexylphthalate (DEHP).

Since conventional tubes use a PVC-based flexible composition and such tube is commonly used to transfer or handle fluids of medicines, foods and beverages, certain formulations including processing aids or plasticizers, such as di-2-ethylhexylphthalate (DEHP), may elute into the transfer stream and possibly end up in the body of consumers and thus increase their risk of exposure to plasticizers.

Accordingly, an improved flexible tube would be desirable.

SUMMARY

In an embodiment, a flexible tube includes a polymer composition of a poly vinyl chloride having a molecular weight greater than about 1.0 inherent viscosity (IV) and a bio-based plasticizer.

In another embodiment, a method of forming a flexible tube is provided. The method includes compounding a poly vinyl chloride having a molecular weight greater than about 1.0 inherent viscosity (IV) with a bio-based plasticizer to form a polymer composition; and extruding the polymer composition into the flexible tube.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

Figure 1:
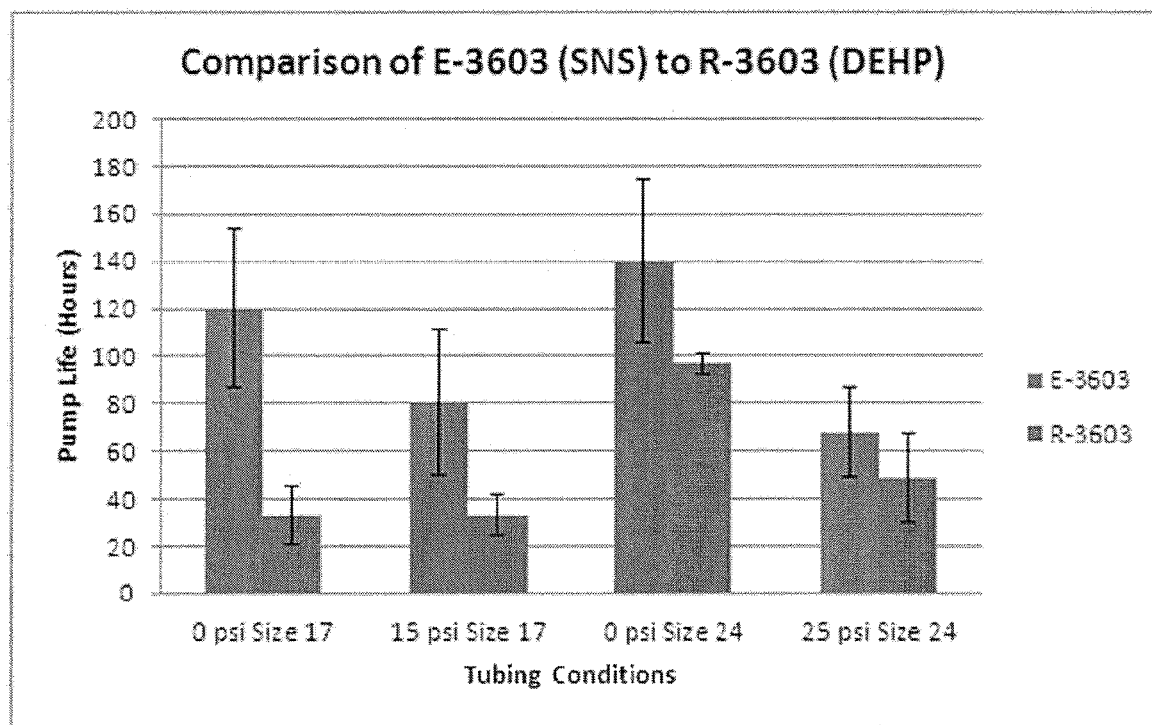
FIGS. 1-4 include graphical illustrations of pump life results for exemplary blends of flexible tubes with a bio-based plasticizer and a phthalate plasticizer.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

A flexible tube includes a polymer composition including a polymer and a bio-based plasticizer. The polymer includes a thermoplastic elastomer. The bio-based plasticizer provides a non-toxic source suitable for thermoplastic elastomer formulations. The tube including the polymer and bio-based plasticizer is flexible with a surface that has low levels of extractables in a fluid environment and improved mechanical properties compared to conventionally available thermoplastic elastomer formulations.

The flexible tube includes the polymer formed of the thermoplastic elastomer. Any reasonable thermoplastic elastomer is envisioned. In an embodiment, the thermoplastic elastomer is a polyolefin. In a particular embodiment, the thermoplastic elastomer is a halogenated polyolefin. For example, the halogenated polyolefin may include a polymer, a polymer blend, or a copolymer formed from a monomer, such as ethylene, propylene, vinyl chloride, vinylidene chloride, vinyl fluoride, vinylidene fluoride, tetrafluoroethylene, chlorotrifluoroethylene or combinations thereof. As such, the thermoplastic elastomer may include polyethylene, polypropylene, polyvinylchloride (PVC), polyvinylidene chloride (PVDC), polyvinylflouride (PVF), polyvinylidenefluoride (PVDF), polytetrafluoroethylene (PTFE), polychlorotrifluoroethylene (PCTFE), or combinations thereof. In a particular embodiment, the polymer is polyvinyl chloride. In a more particular embodiment, the polyvinyl chloride is a homopolymer. For instance, the homopolymer of polyvinyl chloride includes the repeating monomeric units of a vinyl chloride. As used herein "homopolymer" describes polyvinyl chloride having at least 95%, or even at least 99% of vinyl chloride monomeric repeating units based on the total polyvinyl chloride chemical composition.

In an embodiment, the thermoplastic elastomer has a desirable molecular weight. For instance, the thermoplastic elastomer has a desirable molecular weight for ease of processing with the plasticizer. In a particular embodiment, the thermoplastic elastomer has a molecular weight greater than about 1.0 inherent viscosity (IV), such as greater than about 1.1 inherent viscosity, or even greater than about 1.4 inherent viscosity, as measured by ASTM-D1243. In a more particular embodiment, the thermoplastic elastomer is a polyvinyl chloride having an inherent viscosity greater than 1.0, as measured by ASTM-D1243. In an exemplary embodiment, the thermoplastic elastomer is a high molecular weight thermoplastic elastomer. "High molecular weight" as used herein refers to a thermoplastic elastomer having an inherent viscosity greater than about 1.4, such as greater than about 1.6.

The polymer composition further includes a plasticizer, such as a bio-based plasticizer. The plasticizer is added to the thermoplastic elastomer to increase the flexibility of the polymer composition without chemically reacting with the monomer or monomers of the thermoplastic elastomer, i.e. decrease the shore A durometer of the resulting polymer composition. A "bio-based" plasticizer as used herein refers to a plasticizer that is naturally derived, such as plant based. Any suitable bio-based plasticizer is envisioned. A suitable bio-based plasticizer is, for example, derived from a vegetable based material such as a castor oil, a soybean oil, linseed oil, tall oil, the like, or a combination thereof. In an embodiment, the bio-based plasticizer is derived from a castor oil, such as a fully hydrogenated castor oil. A fully hydrogenated castor oil also is known as castor wax. "Fully hydrogenated" as used herein refers to a castor oil that has been exposed to hydrogen, typically in presence of a catalyst. In a particular embodiment, a fully hydrogenated castor oil refers to a castor oil that has been exposed to hydrogen, typically in presence of a catalyst, leaving no unsaturated carbon-carbon bonds. In an embodiment, the bio-based plasticizer includes a fully hydrogenated castor oil that is acetylated to provide an acetylated monoglyceride. Typically, the acetylated monoglyceride is about 85% by weight of the composition of the bio-based plasticizer. An exemplary castor oil bio-based plasticizer is commercially available as Grinsted® Soft-n-Safe, a fully hydrogenated castor oil that is acetylated, from Danisco based in Brabrand, Denmark. Other exemplary bio-based plasticizers include, but are not limited to, Plasthall PR-610 and LCOA commercially available from The Hallstar Company based in Chicago, Ill.; SGP9100D and SGP2100D commercially available from Segetis, Inc. based in Golden Valley, Minn.; Ecolibrium commercially available from The Dow Chemical Company; Rymsaplas Bio525 and Rymsaplas T400 commercially available from Resinas y Materiales based in Bangor, Me.; and PATPLAS Bio-530 commercially available from Pat Products, Inc. based in Bangor, Me.

The bio-based plasticizer is included in the polymer composition in an amount to improve processability of the thermoplastic elastomer. As stated, the bio-based plasticizer is compounded with the thermoplastic elastomer to decrease the shore A durometer and increase the flexibility of the resulting compounded article. Any suitable amount of bio-based plasticizer is envisioned. In an embodiment, the bio-based plasticizer is present at up to about 50% by weight based on the total weight of the polymer composition, such as an amount of 30% by weight to about 50% by weight based on the total weight of the polymer composition. In another embodiment, the bio-based plasticizer may be present at an amount of greater than about 50% by weight based on the total weight of the polymer composition.

The bio-based plasticizer has further desirable properties when compounded with the thermoplastic elastomer. For instance, the bio-based plasticizer has a volatility after 3 hours at 350° F. of less than about 0.5%, as measured by ASTM-D1203. In comparison, a phthalate plasticizer, such as di-2-ethylhexyl phthalate (DEHP), has a volatility after 3 hours at 350° F. of less than about 1.75%, as measured by ASTM-D1203. The bio-based plasticizer has lower volatility during the compounding process of the bio-based plasticizer and the thermoplastic elastomer compared to the phthalate plasticizer. In an embodiment, the bio-based plasticizer increases the efficacy of a flexible tube when used with a peristaltic pump. Further, the bio-based plasticizer compound has a water extraction resistance of less than about 0.2% weight loss when tested after a 5 hour boiling water test. In comparison, a phthalate plasticizer, such as di-2-ethylhexyl phthalate (DEHP), has a water extraction resistance of about 0.7% weight loss when tested after a 5 hour boiling water test, as measured by ASTM-D471. The water extraction resistance demonstrates that the bio-based plasticizer migrates out of the thermoplastic elastomer into its surrounding environment less than the phthalate plasticizer. Properties such as volatility and water extraction resistance are demonstrative of desirable properties of the bio-based plasticizer compared to the phthalate plasticizer.

In an exemplary embodiment, the polymer composition further includes any additive envisioned such as a lubricant, a filler, a secondary plasticizer, an antioxidant, a colorant, or any combination thereof. Exemplary lubricants include silicone oil, waxes, slip aids, antiblock agents, the like, or any combination thereof. Exemplary lubricants further include silicone grafted polyolefin, polyethylene or polypropylene waxes, Oleic acid amide, erucamide, stearate, fatty acid esters, the like, or any combination thereof. Typically, the lubricant may be present at less than about 2.0% by weight of the total weight of the polymer composition. In an embodiment, the lubricant may be present at less than about 0.5% by weight of the total weight of the polymer composition. Exemplary antioxidants include phenolic, hindered amine antioxidants. Exemplary fillers include calcium carbonate, talc, radio-opaque fillers such as barium sulfate, bismuth oxychloride, any combinations thereof, and the like. Exemplary secondary plasticizers include any known plasticizers such as mineral oils, soybean oil, such as epoxidized soybean oil, the like, or any combination thereof. Typically, an additive may be present at an amount of not greater than about 50% by weight of the total weight of the polymer composition, such as not greater than about 40% by weight of the total weight of the polymer composition, or even not greater than about 30% by weight of the total weight of the polymer composition.

In an alternative embodiment, the polymer composition may be substantially free of a lubricant, a filler, a secondary plasticizer, an antioxidant, or combination thereof. Further, the polymer composition is substantially free of an endocrine disrupter, an animal derived additive, or combination thereof. In an embodiment, the polymer composition is substantially free of any phthalate composition. In a particular embodiment, the polymer composition is substantially free of any phthalate plasticizer. "Substantially free" as used herein refers to a polymer composition containing less than about 0.1% by weight, or even less of any of the aforementioned additives based on the total weight % of the polymer composition. For instance, the polymer composition may consist essentially of the thermoplastic elastomer and the bio-based plasticizer. As used herein, the polymer composition may be substantially free of any additional polymers or materials that may affect the basic and novel characteristics of the polymer composition.

In an embodiment, the flexible tube may be formed by any reasonable means, such as extrusion or injection molding. In an embodiment, the thermoplastic elastomer and bio-based plasticizer may be melt processed by dry blending or compounding. The dry blend may be in powder, granular, or pellet form. In a particular embodiment, to form the flexible tube, pellets of the corresponding monomer or polymer may be compounded with the plasticizer through a co-rotating intermeshing twin-screw extruder, cooled by a water bath, and cut into compound pellets. The flexible article may be made by a continuous compounding process or batch related process. The resulting pellets of the blend are fed into an extruder with a tube die. The tube is extruded through the tube die, the tube having an inner surface that defines a central lumen of the tube. Any cure conditions are envisioned, such as thermal cure.

Once formed, the flexible tube advantageously can withstand sterilization processes. In an embodiment, the flexible tube is sterilized by any method envisioned. Exemplary sterilization methods include steam, gamma, ethylene oxide, E-beam techniques, combinations thereof, and the like. In a particular embodiment, the flexible tube is sterilized by steam sterilization. In an exemplary embodiment, the flexible tube is heat-resistant to steam sterilization at temperatures up to about 121° C. for a time of up to about 30 minutes. In an embodiment, the flexible tube is heat resistant to steam sterilization at temperatures of up to about 135° C. for a time of up to about 20 minutes. In an embodiment, the flexible tube may be sterilized via gamma sterilization of up to about 50 kGy, such as at least about 35 kGy, or even at least about 25 kGy.

The present embodiments can produce articles having desirable mechanical properties. In particular, the resulting blends have desirable flexibility, substantial clarity or translucency, and the like. Flexibility of the final tube is typically with a shore A of about 40 to about 90, such as about 55 to about 75. Clarity of the flexible tube is checked visually and classified into four levels in terms of transparency: clear, translucent, hazy, and opaque. In an embodiment, the flexible tube is not opaque and may be clear or translucent. In a particular embodiment, the flexible tube is clear. In a more particular embodiment, the flexible tube has a light transmission greater than about 40%, such as greater than about 50%, or even greater than about 60% in the visible light wavelength range.

In an embodiment, the flexible material when formed into a tube has properties such as desirable burst pressure, pump life, and flex fatigue resistance. For instance, the burst pressure of a tube having an average inner diameter of 0.250 inches and an average outer diameter of 0.375 inches is greater than about 97 psi at a temperature of 73° F., as measured by ASTM-D1599. In an embodiment, the tube of the present disclosure has desirable pump life. For instance, the tube has a pump life of at least about 60 hours, at least about 100 hours, at least about 250 hours, or even greater on a Masterflex peristaltic pump using an L/S 17 standard pump head at 600 rpm with water as a medium, room temperature at 0 psi backpressure. The flexible tube of the thermoplastic elastomer, such as a polyvinyl chloride, having the bio-based plasticizer has a pump life greater than about 50% to about 300%, or even greater in comparison to a polyvinyl chloride tube with a phthalate plasticizer. In an embodiment, the tube having the bio-based plasticizer has a desirable flex fatigue resistance at least comparable to or even better than a polyvinyl chloride tube with a phthalate plasticizer.

Further, the flexible tube has desirable mechanical and physical properties such as tensile strength, elongation, and tensile modulus. For instance, the flexible tube has a tensile strength of at least about 1600 psi, at least about 1800 psi, at least about 2000 psi, or even greater, as measured by ASTM-D412. In an embodiment, the flexible tube has an elongation of at least about 350%, such as at least about 400%, such as at least about 500%, or even greater, as measured by ASTM-D412. In an embodiment, the flexible tube has a tensile modulus at 100% elongation of at least about 550 psi, such as at least about 600 psi, such as at least about 700 psi, or even greater, as measured by ASTM-D412.

In exemplary embodiments, the flexible material disclosed above in relation to a flexible tube can be used in a variety of applications. Applications for the flexible tube are numerous. In particular, the non-toxic nature of the flexible tube makes the flexible tube useful for any application where toxicity is undesired. For instance, the flexible tube has potential for FDA, ADCF, USP Class VI, NSF, European Pharmacopoeia compliant, United States Pharmacopoeia (USP) compliant, USP physiochemical compliant, ISO 10993 Standard for evaluating biocompatibility of a medical device, and other regulatory approvals. In a particular embodiment, the flexible tube is non-cytotoxic, non-hemolytic, non-pyrogenic, animal-derived component-free, non-mutagenic, non-bacteriostatic, non-fungistatic, or any combination thereof.

For example, the flexible tube may be used in applications such as industrial, medical applications, health care, biopharmaceutical, drinking water, food & beverage applications, dairy applications, laboratory applications, FDA applications, and the like. In an exemplary embodiment, the flexible tube may be used in applications such as a hydration tube for sports and entertainment equipment, a fluid transfer tube in food and beverage processing equipment, a fluid transfer tube in medical and health care, biopharmaceutical manufacturing equipment, and peristaltic pump tube for medical, lab and biopharmaceutical applications. In a particular embodiment, the flexible tube may be used in a peristaltic pump. In an exemplary embodiment, the tube may be part of molded assemblies typically used in biopharmaceutical applications such as pumping, bioreactor processing, sampling, filling, and the like. In an embodiment, the tube may be configured into a braided product or multilayer product for tubing. In an embodiment, the tube may be used for high pressure pump applications. "High pressure" as used herein refers to a pressure of at least about 40 psi, or greater. In an embodiment, "high pressure" is at a pressure of about 40 psi and about 60 psi.

In a particular embodiment, a fluid source, such as a container, reactor, reservoir, tank, or bag, is coupled to a flexible tube. The flexible tube may engage a pump, fitting, valve, dispenser, or another container, reactor, reservoir, tank, or bag. In an example, the flexible tube may be coupled to a water container and may have a dispenser fitting on the distal end. In another example, the flexible tube may be coupled to a fluid bag and coupled to a valve at the distal end. In a further example, the flexible tube may be coupled to a container, be engaged in a pump, and be coupled to a second container at a distal end.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A flexible tube comprising a polymer composition of a poly vinyl chloride having a molecular weight greater than about 1.0 inherent viscosity (IV) and a bio-based plasticizer.

Item 2. The flexible tube of Item 1, wherein the poly vinyl chloride has a molecular weight greater than about 1.0 inherent viscosity (IV).

Item 3. The flexible tube of Item 1, wherein the poly vinyl chloride is a homopolymer.

Item 4. The flexible tube of Item 1, wherein the bio-based plasticizer is derived from a fully hydrogenated castor oil.

Item 5. The flexible tube of Item 4, wherein the bio-based plasticizer derived from castor oil includes an acetylated monoglyceride.

Item 6. The flexible tube of Item 1, wherein the bio-based plasticizer is present at up to about 50% by weight based on the total weight of the polymer composition.

Item 7. The flexible tube of Item 6, wherein the bio-based plasticizer is present at an amount of about 30% by weight to about 50% by weight of the total weight of the polymer composition.

Item 8. The flexible tube of Item 1, wherein the bio-based plasticizer has a volatility after 3 hours at 350° F. of less than about 0.5%.

Item 9. The flexible tube of Item 1, wherein the bio-based plasticized PVC compound has a water extraction resistance of less than about 0.2% weight loss when tested after a 5 hour boiling water test.

Item 10. The flexible tube of Item 1, wherein the bio-based plasticized PVC compound is phthalate free.

Item 11. The flexible tube of Item 1, wherein the polymer composition is substantially free of an animal derived additive.

Item 12. The flexible tube of Item 1, wherein the tube includes an inner surface that defines a central lumen of the tube.

Item 13. The flexible tube of Item 1, having a pump life of at least about 60 hours as measured at 600 RPM using a Masterflex peristaltic pump containing a L/S 17 standard pump head at 0 psi.

Item 14. The flexible tube of Item 13, having a pump life of at least about 100 hours.

Item 15. The flexible tube of Item 14, having a pump life of at least about 250 hours.

Item 16. The flexible tube of Item 1, having a pump life that is greater than about 50% to about 300% compared to a polyvinyl chloride tube with a phthalate plasticizer.

Item 17. The flexible tube of Item 1, having a shore A durometer of about 55 to about 75.

Item 18. The flexible tube of Item 1, having a tensile strength of at least about 1600 psi.

Item 19. The flexible tube of Item 1, having an elongation of at least about 350%.

Item 20. The flexible tube of Item 1, having a tensile modulus at 100% elongation of at least about 550 psi.

Item 21. The flexible tube of Item 1, having biocompatibility and animal derived component free formulation ingredients.

Item 22. The flexible tube of Item 1, having a light transmission greater than about 40% in the visible light wavelength range.

Item 23. The flexible tube of Item 1, wherein the tube is sterilizable.

Item 24. The flexible tube of Item 1, having an inner diameter of about 0.010 inches to about 5.00 inches.

Item 25. The flexible tube of Item 24, having an inner diameter of about 0.06 inches to about 1.00 inches.

Item 26. The flexible tube of Item 1, wherein the tube is used for biopharm applications, FDA applications, food and beverage applications, dairy applications, medical applications, laboratory applications, or combination thereof.

Item 27. The flexible tubing of Item 1, wherein the tube is a portion of assemblies used in biopharmaceutical applications of pumping, bioreactor processing, sampling, filling, or combination thereof.

Item 28. A method of forming a flexible tube, the method comprising compounding a poly vinyl chloride having a molecular weight greater than about 1.0 inherent viscosity (IV) with a bio-based plasticizer to form a polymer composition; and extruding the polymer composition into the flexible tube.

Item 29. The method of Item 28, wherein the poly vinyl chloride has a molecular weight greater than about 1.0 inherent viscosity (IV).

Item 30. The method of Item 28, wherein the poly vinyl chloride is a homopolymer.

Item 31. The method of Item 28, wherein the bio-based plasticizer is derived from a fully hydrogenated castor oil.

Item 32. The method of Item 31, wherein the bio-based plasticizer derived from a castor oil includes an acetylated monoglyceride.

Item 33. The method of Item 28, wherein the bio-based plasticizer is present at up to about 50% by weight based on the total weight of the polymer composition.

Item 34. The method of Item 33, wherein the bio-based plasticizer is present at an amount of about 30% by weight to about 50% by weight of the total weight of the polymer composition.

Item 35. The method of Item 28, wherein the bio-based plasticizer has a volatility after 3 hours at 350° F. of less than about 0.5%.

Item 36. The method of Item 28, wherein the bio-based plasticizer has a water extraction resistance of less than about 0.2% weight loss when tested after a 5 hour boiling water test.

Item 37. The method of Item 28, wherein the bio-based plasticizer is phthalate free.

Item 38. The method of Item 28, wherein the polymer composition is substantially free of an animal derived additive.

Item 39. The method of Item 28, wherein the tube includes an inner surface that defines a central lumen of the tube.

Item 40. The method of Item 28, wherein the tube has a pump life of at least about 60 hours as measured at 600 RPM using a Masterflex peristaltic pump containing a L/S 17 standard pump head at 0 psi.

Item 41. The method of Item 40, having a pump life of at least about 100 hours.

Item 42. The method of Item 41, having a pump life of at least about 250 hours.

Item 43. The method of Item 28, having a pump life that is greater than about 50% to about 300% compared to a polyvinyl chloride tube with a phthalate plasticizer.

Item 44. The method of Item 28, wherein the tube has a shore A durometer of about 55 to about 75.

Item 45. The method of Item 28, wherein the tube has a tensile strength of at least about 1600 psi.

Item 46. The method of Item 28, wherein the tube has an elongation of at least about 350%.

Item 47. The method of Item 28, wherein the tube has a tensile modulus at 100% elongation of at least about 550 psi.

Item 48. The method of Item 28, wherein the tube has biocompatibility and animal derived component free formulation ingredients.

Item 49. The method of Item 28, wherein the tube has a light transmission greater than about 40% in the visible light wavelength range.

Item 50. The method of Item 28, wherein the tube is sterilized.

Item 51. The method of Item 28, wherein the tube has an inner diameter of about 0.010 inches to about 5.00 inches.

Item 52. The method of Item 51, wherein the tube has an inner diameter of about 0.06 inches to about 1.00 inches.

Item 53. The method of Item 28, wherein the tube is used for biopharm applications, FDA applications, food and beverage applications, dairy applications, medical applications, laboratory applications, or combination thereof.

Item 54. The method of Item 28, wherein the tube is a portion of assemblies used in biopharmaceutical applications of pumping, bioreactor processing, sampling, filling, or combination thereof.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

A number of exemplary tubes are extruded. There are six compounds, E-LFL, LFL, E-3603, R-3603, B-44-4X (19EX), and B-44-4X. The compositions are as follows:

E-LFL: a PVC of Atlas S160 obtained from PolyOne includes a plasticizer of Soft-N-Safe (SNS) at a level of 48% by weight of the composition.

LFL: a PVC of Geon 407 PVC obtained from PolyOne includes a plasticizer of DEHP at a level of 47.5% by weight of the composition.

E-3603: a PVC of Oxy 255F obtained from Oxy includes a plasticizer of Soft-N-Safe (SNS) at a level of 47% by weight of the composition.

R-3603: a PVC of Oxy 255F obtained from Oxy includes a plasticizer of DEHP at a level of 44.3% by weight of the composition.

B-44-4X (19EX): the PVC is Oxy 255F obtained from Oxy includes a plasticizer of Soft-N-Safe (SNS) at a level of 40% by weight of the composition.

B-44-4X: the PVC is Oxy 255F obtained from Oxy includes a plasticizer of DEHP at a level of 39% by weight of the composition.

Results for testing on pump life can be seen in FIGS. 1-4. Tubing is extruded into 3 different sizes ranging in inner diameter (ID) and outer diameter (OD). Unless otherwise indicated, the tubes are tested for pump life on a Masterflex peristaltic pump using an L/S 17 standard pump head at 600 rpm with water as a medium at room temperature.

FIG. 1 is a comparison of E-3603 (SNS) to R-3603 (DEHP). The size of the tube and pressure conditions during pump life testing are indicated in the chart. All tubes prepared with the SNS show an increase in pump life compared to the tubes prepared with DEHP.

Figure 2:
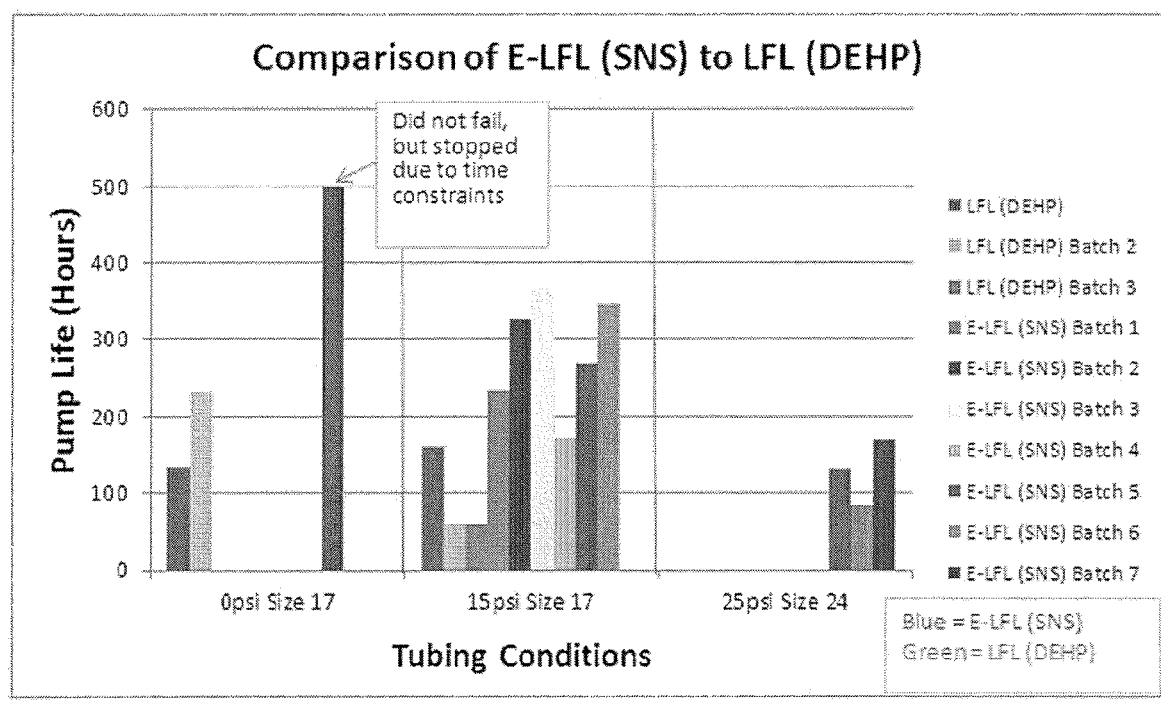

FIG. 2 is a comparison of several batches of E-LFL (SNS) to several batches of LFL (DEHP). The size of the tube and pressure conditions during pump life testing are indicated in the chart. All tubes prepared with the SNS show an increase in pump life compared to the tubes prepared with DEHP.

Figure 3:
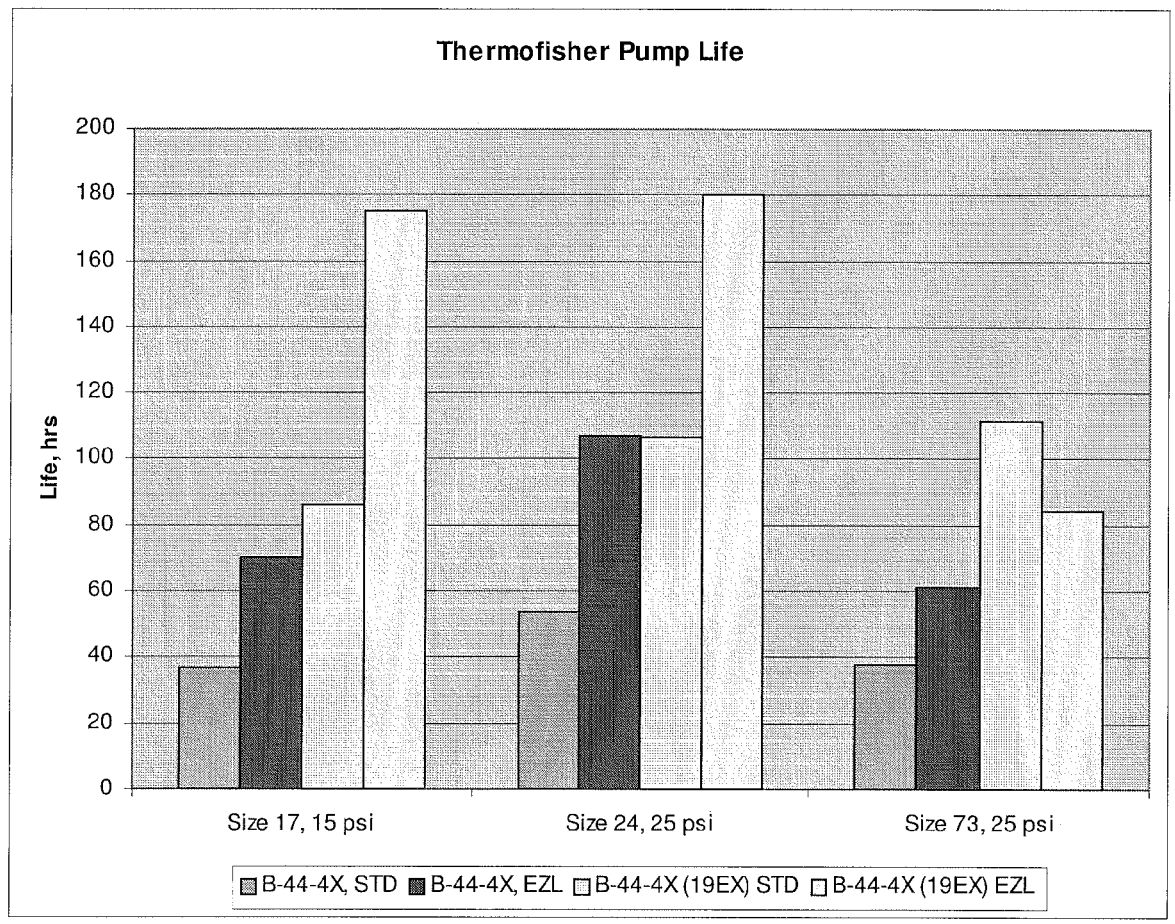

FIG. 3 is a comparison of B-44-4X(19EX) (SNS) to B-44-4X (DEHP). The size of the tube and pressure conditions during pump life testing are indicated in the chart. "STD" indicates the L/S Standard pump head whereas "EZL" indicates an EZ Load pump head. All tubes prepared with the SNS show an increased pump life compared to the tubes prepared with DEHP, using the same pump head conditions.

Figure 4:
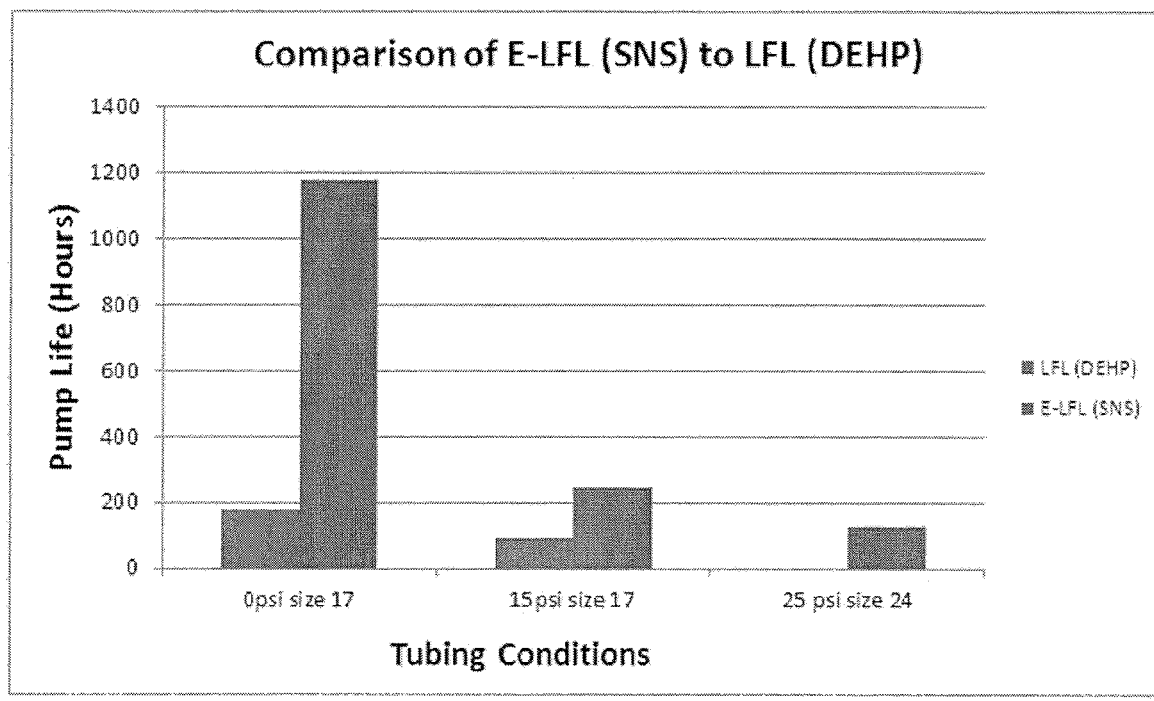

FIG. 4 is a comparison of E-LFL (SNS) to LFL (DEHP). The size of the tube and pressure conditions during pump life testing are indicated in the chart. All tubes prepared with the SNS show an increase in pump life compared to the tubes prepared with DEHP.

The Figures clearly demonstrate that in all instances, the polyvinyl chloride tubes containing the bio-based plasticizer, SNS, have an increase in pump life compared to the tubes prepared with DEHP. Unexpectedly, the increase in pump life is greater than about 50% to about 300%, or even greater in comparison to a polyvinyl chloride tube with a phthalate plasticizer.

Tubing is extruded in a range of tubing sizes. In an embodiment, the tube has an inner diameter of about 0.010 inches to about 5.00 inches, such as about 0.06 inches to about 1.00 inches, however, any reasonable size is envisioned. The thickness of the tube may be produced as thin as practicably allowable by process, such as a thickness of greater than about 5 mils.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A flexible tube comprising a polymer composition consisting of a polymer and a bio-based plasticizer, wherein the polymer consists of a poly vinyl chloride having a molecular weight greater than about 1.1 inherent viscosity (IV) and wherein the bio-based plasticizer comprises a fully hydrogenated castor oil, wherein the bio-based plasticizer is present at an amount of greater than 30% by weight of the total weight of the polymer composition, wherein the flexible tube has an inner surface that defines a central lumen of the flexible tube and a shore A durometer of about 40 to about 90.

2. A method of forming a flexible tube, the method comprising:
   compounding a polymer composition consisting of a polymer with a bio-based plasticizer to form the polymer composition, wherein the polymer consists of a poly vinyl chloride having a molecular weight greater than about 1.1 inherent viscosity (IV) and wherein the bio-based plasticizer comprises a fully hydrogenated castor oil, wherein the bio-based plasticizer is present at an amount of greater than 30% by weight of the total weight of the polymer composition; and
   extruding the polymer composition into the flexible tube having an inner surface that defines a central lumen of the flexible tube, wherein the flexible tube has a shore A durometer of about 40 to about 90.

3. The flexible tube of claim 1, wherein the poly vinyl chloride has a molecular weight greater than about 1.4 inherent viscosity (IV).

4. The flexible tube of claim 1, wherein the poly vinyl chloride is a homopolymer.

5. The flexible tube of claim 1, wherein the bio-based plasticizer is present at up to about 50% by weight based on the total weight of the polymer composition.

6. The flexible tube of claim 1, wherein the bio-based plasticizer has a volatility after 3 hours at 350° F. of less than about 0.5%.

7. The flexible tube of claim 1, wherein the polymer composition has a water extraction resistance of less than about 0.2% weight loss when tested after a 5 hour boiling water test.

8. The flexible tube of claim 1, wherein the polymer composition is phthalate free.

9. The flexible tube of claim 1, having a pump life of at least about 60 hours as measured at 600 RPM using a Masterflex peristaltic pump containing a L/S 17 standard pump head at 0 psi.

10. The flexible tube of claim 1, having a pump life that is greater than about 50% to about 300% compared to a polyvinyl chloride tube with a phthalate plasticizer.

11. The flexible tube of claim 1, having a shore A durometer of about 55 to about 75.

12. The flexible tube of claim 1, having a tensile strength of at least about 1600 psi.

13. The flexible tube of claim 1, having an elongation of at least about 350%.

14. The flexible tube of claim 1, having a tensile modulus at 100% elongation of at least about 550 psi.

15. The flexible tube of claim 1, having biocompatibility and animal derived component free formulation ingredients.

16. The flexible tube of claim 1, having a light transmission greater than about 40% in the visible light wavelength range.

17. The flexible tube of claim 1, wherein the tube is sterilizable.

18. The flexible tube of claim 1, having an inner diameter of about 0.010 inches to about 5.00 inches.

19. The flexible tube of claim 1, wherein the tube is used for biopharm applications, FDA applications, food and beverage applications, dairy applications, medical applications, laboratory applications, or combination thereof.

* * * * *